(12) United States Patent
Tu et al.

(10) Patent No.: US 11,409,034 B2
(45) Date of Patent: Aug. 9, 2022

(54) SILICON PHOTONICS INTEGRATION CIRCUIT

(71) Applicant: MARVELL ASIA PTE, LTD., Singapore (SG)

(72) Inventors: Xiaoguang Tu, Santa Clara, CA (US); Masaki Kato, Palo Alto, CA (US); Yu Li, Santa Clara, CA (US)

(73) Assignee: MARVELL ASIA PTE LTD., Singapore (SG)

( * ) Notice: Subject to any disclaimer, the term of this patent is extended or adjusted under 35 U.S.C. 154(b) by 85 days.

(21) Appl. No.: 16/776,362

(22) Filed: Jan. 29, 2020

(65) Prior Publication Data

US 2021/0231866 A1    Jul. 29, 2021

(51) Int. Cl.
*G02B 6/14* (2006.01)
*G02B 6/12* (2006.01)
*G02B 6/13* (2006.01)

(52) U.S. Cl.
CPC .......... *G02B 6/12004* (2013.01); *G02B 6/13* (2013.01); *G02B 6/14* (2013.01); *G02B 2006/1215* (2013.01); *G02B 2006/12061* (2013.01); *G02B 2006/12123* (2013.01)

(58) Field of Classification Search
None
See application file for complete search history.

(56) References Cited

U.S. PATENT DOCUMENTS

2019/0384003 A1* 12/2019 Painchaud ........... G02B 6/2821

FOREIGN PATENT DOCUMENTS

| CN | 110658586 | * | 1/2020 | |
| EP | 2924481 A1 | * | 9/2015 | ........... H01S 5/1032 |
| WO | WO-2014171005 A1 | * | 10/2014 | .............. H04J 14/02 |

* cited by examiner

*Primary Examiner* — Chad H Smith

(57) ABSTRACT

A silicon photonics integration circuit includes a silicon substrate member; a RX sub-circuit formed in the silicon substrate member including multiple RX-input ports each having a mode size converter configured to receive an incoming light signal into one of multiple waveguides and multiple RX photo detectors coupled respectively to the multiple waveguides; and a TX sub-circuit formed in the silicon substrate member including one or more TX-input ports each having a mode size converter coupled to a first TX photo detector into one input waveguide, one or more 1×2 directional couplers each coupled between the input waveguide and two mod-input waveguides, multiple modulators coupled between respective multiple mod-input waveguides and multiple mod-output waveguides each being coupled to a second TX photo detector into one of multiple output waveguides, and multiple TX-output ports each having a mode size converter coupled to respective one of the multiple output waveguides.

24 Claims, 10 Drawing Sheets

SILICON PHOTONICS INTEGRATION CIRCUIT

BACKGROUND OF THE INVENTION

The present invention relates to optical telecommunication techniques. More particularly, the present invention provides a photonics integration circuit integrated on a single silicon-based wafer, an advanced optical transceiver based on the photonics integration circuit, and methods for making the same.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs. Optical communication is chosen for systems requiring higher bandwidth and longer distance that electrical cable cannot accommodate. An optical transceiver includes an optical transmitter and an optical receiver. By the optical transceiver, the received optical signal can be converted to an electrical signal capable of being processed by an IC, or the processed electrical signal can be converted to the optical signal to be transmitted via optical fibers.

Future optical communication system is driven by the increasing demand of higher data bandwidth and lower cost. High speed optical signals travelling within and between data centers need advanced optical transceiver with higher data rate in smaller form factor with lower cost. Photonics integration circuits chip is one of the most important chips inside the optical transceiver which determines the data communication speed and quality. Because of the great advances in CMOS-compatible low-cost fabrication technology being applied in enhancement of opto-electronics, it is substantially desired to develop Silicon photonics integration circuits that have high optical-electrical conversion efficiency and conversion speed, low optical insertion loss, and low power consumption.

BRIEF SUMMARY OF THE INVENTION

The present invention relates to optical telecommunication techniques. More particularly, the present invention provides a silicon photonics integration circuit (SPIC) made on a single Silicon-based wafer. Merely by example, the SPIC is comprised of novel mode side converters, high-performance silicon optical modulator, Germanium-based high-speed photo diode, and low-loss passive waveguide devices. The SPICs can be applied in 100G and 400G data communication system following IEEE 802.3bs, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 3 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a silicon photonics integration circuit. The silicon photonics integration circuit includes a silicon substrate member. Additionally, the silicon photonics integration circuit includes a RX sub-circuit formed in the silicon substrate member comprising multiple RX-input ports each having a mode size converter configured to receive an incoming light signal into one of multiple waveguides and multiple RX photo detectors coupled respectively to the multiple waveguides. Furthermore, the silicon photonics integration circuit includes a TX sub-circuit formed in the silicon substrate member comprising one or more TX-input ports each having a mode size converter coupled to a first TX monitoring photo detector into one input waveguide. The TX sub-circuit further includes one or more 1×2 directional couplers each coupled between the input waveguide and two mod-input waveguides. Additionally, the TX sub-circuit includes multiple modulators coupled between respective multiple mod-input waveguides and multiple mod-output waveguides each being coupled to a second TX monitoring photo detector into one of multiple output waveguides. Furthermore, the TX sub-circuit includes multiple TX-output ports each having a mode size converter coupled to respective one of the multiple output waveguides. Each TX-input port is configured through the mode size converter thereof to receive a laser light signal monitored by the first TX monitoring photo detector. Each 1×2 directional coupler is configured to split the laser light signal to two input light signals. Each modulator is configured to modulate one input light signal to generate one output light signal in one mod-output waveguide monitored by the second TX monitoring photo detector and outputted to respective one of the multiple output waveguides. Each TX-output port is configured through the mode size converter thereof to output the output light signal.

In a specific embodiment, the present invention provides a method of fabricating a silicon photonics integration circuit. The method includes providing a silicon substrate member. The method further includes a step of forming a RX sub-circuit in the silicon substrate member. The step includes forming multiple RX-input ports each having a mode size converter configured to receive an incoming light signal into a waveguide. The step further includes forming multiple RX photo detectors respectively coupled to the multiple RX-input ports. Additionally, the method includes a step of forming a TX sub-circuit in the silicon substrate member. This step includes forming one or more TX-input ports each comprising a mode size converter coupled to a first TX monitoring photo detector into one input waveguide; forming one or more 1×2 directional couplers each coupled between the input waveguide and two mod-input waveguides; forming multiple modulators coupled respectively between multiple mod-input waveguides and multiple mod-output waveguides each being coupled to a second TX monitoring photo detector into one of multiple output waveguides; and forming multiple TX-output ports each having a mode size converter coupled to respective one of the multiple output waveguides. Each TX-input port is configured through the mode size converter thereof to receive a laser light signal monitored by the first TX monitoring photo detector. Each 1×2 directional coupler is configured to split the laser light signal to two input light signals. Each modulator is configured to modulate one input light signal to generate one output light signal in one mod-output waveguide monitored by the second TX monitoring photo detector and outputted to respective one of the multiple output waveguides. Each TX-output port is configured through the mode size converter thereof to output the output light signal.

The present invention achieves these benefits and others in the context of known silicon photonics technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
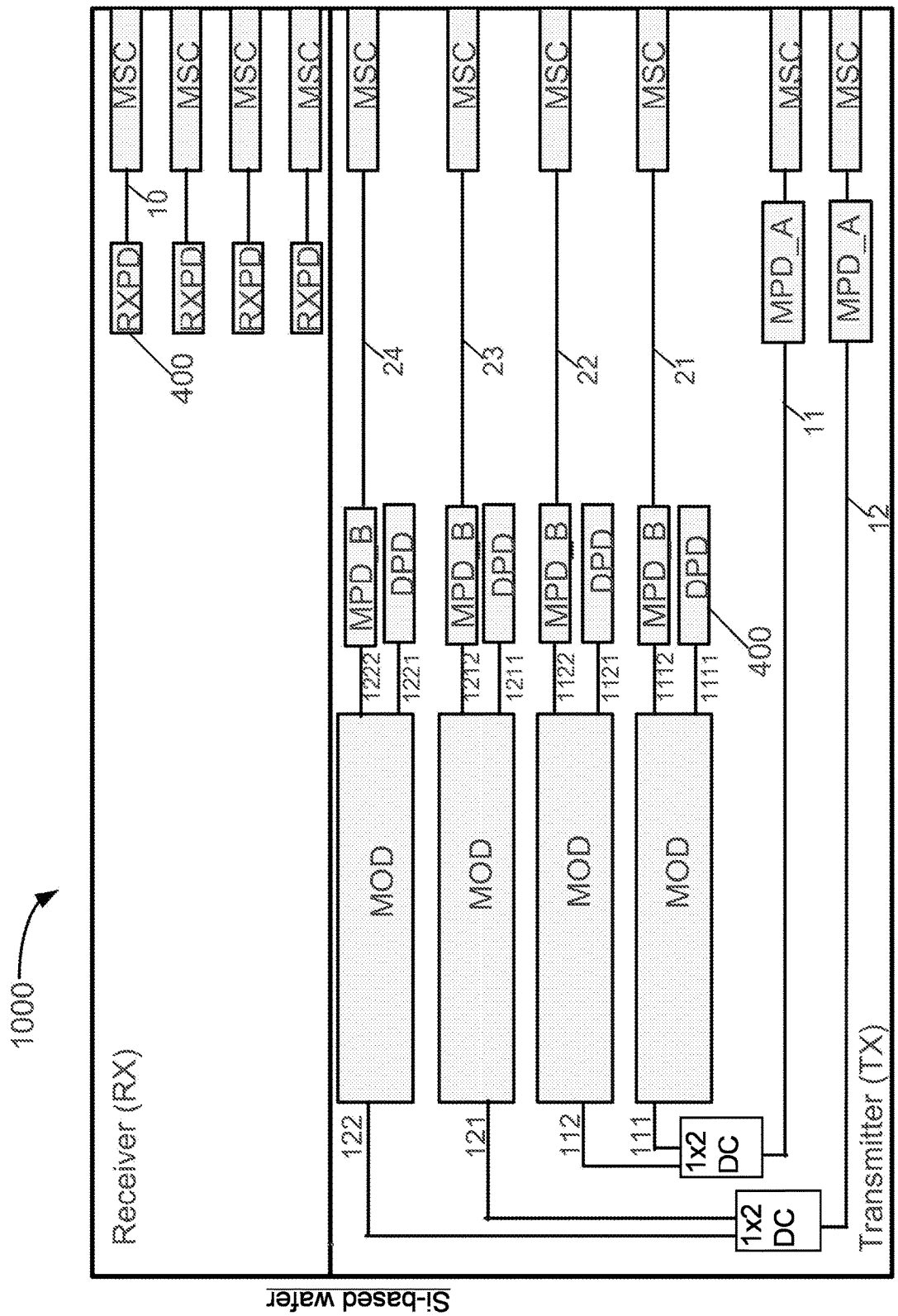
FIG. 1 is a simplified block diagram of a silicon photonics integrated circuit on a Silicon-based wafer for forming an optical transceiver chip according to an embodiment of the present invention.

The present invention relates to optical telecommunication techniques. More particularly, the present invention provides a silicon photonics integration circuit (SPIC) made on a single Silicon-based wafer. Merely by example, the SPIC is comprised of novel mode side converters, high-performance silicon optical modulator, Germanium-based high-speed photo diode, and low-loss passive waveguide devices. The SPICs can be applied in 100 Gbps and 400 Gbps data communication system following IEEE 802.3bs, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, side, edge, central, main, vertical, cross, bar, have been used for convenience purposes only and are not intended to imply any particular fixed direction. Instead, they are used to reflect relative locations and/or directions between various portions of an object.

In an aspect, the present disclosure provides a silicon photonics integrated circuit on a single silicon substrate member. Optionally, the silicon photonics integrated circuit (SPIC) is applied for forming a compact optical transceiver. As data transmission-capacities increase in WDM systems, demand on high-speed, high-bandwidth, low-loss optical transceiver based on silicon photonics platform increasingly attract more and more interest over the recent years. The key indicators that determine the performance of the SPIC includes optical-electrical conversion efficiency and conversion speed, optical insertion loss, optical and electrical power consumption. Improvement on these indicators involves a lot of novelty on each of the components within the photonics integrations circuits. A compact SPIC chip of all passive or active photonics devices with novel structural/performance designs integrated into a silicon-based wafer provides a great potential for advanced data communication applications. Merely as an example, a compact optical transceiver based on the novel SPIC chip with the advantages of high-speed, low power consumption, and low cost can support 100 Gbps and 400 Gbps data center interconnection application and beyond.

FIG. 1 is a simplified block diagram of a silicon photonics integrated circuit on a Silicon-based wafer for forming an optical transceiver chip according to an embodiment of the present invention. This diagram is merely an example, which should not unduly limit the scope of the claims. One of ordinary skill in the art would recognize many variations, alternatives, and modifications. In an embodiment, as shown in FIG. 1, a silicon photonics integrated photonics circuit 1000 is formed in a single silicon-based wafer substrate. In the embodiment, the silicon photonics integrated photonics circuit (SPIC) 1000 is configured to form an optical transceiver. Accordingly, the SPIC is laid out with a Receiver (RX) sub-circuit with multiple RX-input ports and a Transmitter (TX) sub-circuit with one or more light sources and multiple TX-output ports. Optionally, the optical transceiver is a 4-channel optical transceiver configured to receive four incoming light signals and output four output light signals.

Referring to FIG. 1, the RX sub-circuit of the SPIC 1000 is formed in the silicon-based wafer substrate. The RX sub-circuit includes multiple RX-input ports each having a mode size converter (MSC) configured to receive an incoming light signal into one of multiple waveguides 10 and multiple RX photo detectors (RXPD) coupled respectively to the multiple waveguides 10. In the embodiment, the incoming light signals are usually delivered via optical fibers (e.g., from a data center). In order to involve the SPIC into the optical fiber communication system with low coupling loss, a mode size converter MSC is needed in order to solve issues of mode mismatch between the optical fiber and the SPIC. The MSC is a passive photonics device that is wholly formed within the silicon-based wafer substrate. More details will be presented later. Optionally, the silicon-based wafer substrate for forming the MSC includes at least a silicon layer, a cladding layer made by an insulator, and an silicon nitride layer embedded in the cladding layer. Optionally, the silicon-based wafer also contains a Germanium layer. Optionally, the RXPD is provided as a Germanium-based high-speed photo diode 400. One RXPD is coupled in each of the multiple waveguides 10 to receive one incoming light signal and is able to convert the optical signal to an electrical signal to be processed by a digital signal processor through a transimpedance amplifier module, provided an optical transceiver is formed based on the SPEC 1000. More details about the Germanium-based high-speed photo diode will be presented later.

Referring to FIG. 1, the TX sub-circuit of the SPIC 1000 is also formed in the same silicon-based wafer substrate. The TX sub-circuit includes one or more TX-input ports each having a mode size converter (MSC) coupled to a first TX monitoring photo detector (MPD_A) into one input waveguide 11 (or 12) for monitoring optical power of light signals received by the TX-input ports thereof. The TX sub-circuit further includes one or more 1×2 directional couplers (1×2 DC) each coupled between the input waveguide 11 (12) and two mod-input waveguides 111, 112 (or 121, 122). Additionally, the TX sub-circuit includes multiple modulators (MOD) coupled between respective multiple mod-input waveguides (e.g., 111) and multiple mod-output waveguides (e.g., 1111, 1112). For each MOD, one of two mod-output waveguide 1112 is coupled to a second TX monitoring photo detector (MPD_B) for monitoring optical power of modulated light signals outputted by the MOD thereof. Another one of the two mod-output waveguide 1111 is directly coupled to a photo detector (DPD). Optionally, the DPD is provided as a Germanium-based high-speed photo diode 400, similar to that for the RXPD. Furthermore, the TX sub-circuit includes multiple TX-output ports each having a mode size converter (MSC) coupled to respective one of the multiple output waveguides (e.g., 21, 22, 23, 24).

In the embodiment, each TX-input port is configured through the mode size converter (MSC) thereof to receive a laser light signal monitored by the first TX monitoring photo detector (MPD_A). Typically, the laser light is delivered via fiber from a laser device disposed separately from the SPIC 1000 so that MSC is also implemented here for mode matching of the light signal between the SPIC and fiber. Optionally, the MSC used here can be substantially the same as one used for RX input ports. In the embodiment, each 1×2 DC is configured to split the laser light signal to two input light signals. Optionally, the 1×2 DC is a 50/50 splitter so that one laser light from a laser device can be split equally in power providing two input light signals for two channels of the SPIC 1000. Each modulator (MOD) is configured to modulate one input light signal to generate one output light signal to carry communication data stream in one mod-output waveguide (e.g., 1112). The output light signal is monitored by the second TX monitoring photo detector (MPD_B) and outputted to respective one of the multiple output waveguides (e.g., 21). Each TX-output port is configured through the MSC thereof to output the output light signal to a fiber leading to a data center or network. Optionally, each of the waveguides (e.g., 10) in the RX sub-circuit, the input waveguide (e.g, 11), the mod-input waveguide (e.g., 111), the mod-output waveguide (e.g., 1111), and the output waveguide (e.g., 21) in the TX sub-circuit is formed in the silicon-based wafer from the silicon nitride layer to achieve lower optical loss.

Figure 2A:
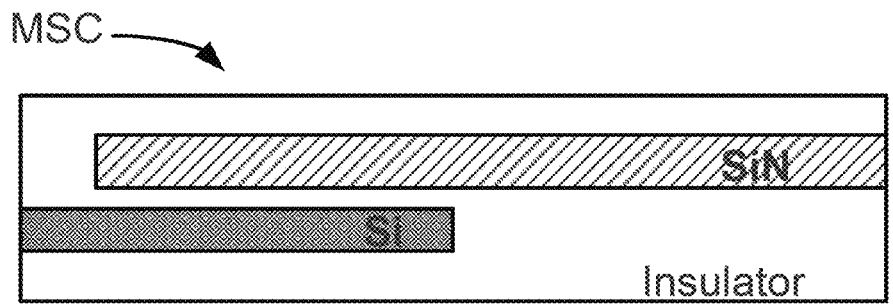
FIG. 2A is a side view of a mode size converter formed in the silicon-based wafer according to an embodiment of the present invention.

FIG. 2A is a side view of a mode size converter formed in the silicon-based wafer according to an embodiment of the present invention. This diagram is merely an example, which should not unduly limit the scope of the claims. One of ordinary skill in the art would recognize many variations, alternatives, and modifications. As shown, the mode size converter (MSC) is a silicon-based waveguide-to-fiber mode conversion structure. Optionally, the MSC is formed in a silicon-based wafer containing a silicon layer and a silicon nitride layer embedded in a cladding layer made by an insulator (such as silicon oxide). In the embodiment, the MSC is formed with a first shaped linear structure made by the silicon layer, a second shaped linear structure made by the silicon nitride layer disposed above the silicon layer with a separation in the cladding layer, as seen in the side view diagram, such that the second shaped linear structure is partially overlapped with the first shaped linear structure.

Figure 2B:
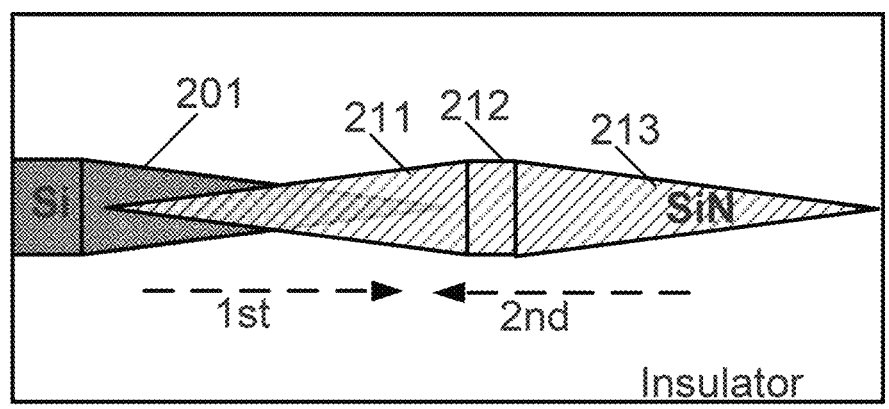
FIG. 2B is a top view of the mode size converter formed in the silicon-based wafer according to the embodiment of the present invention.

FIG. 2B is a top view of the mode size converter formed in the silicon-based wafer according to the embodiment of the present invention. This diagram is merely an example, which should not unduly limit the scope of the claims. One of ordinary skill in the art would recognize many variations, alternatives, and modifications. As shown, the first shaped linear structure of the MSC described in FIG. 2A includes a triangular shaped portion 201 at an end thereof with a tip pointing towards a first direction. The second shaped linear structure includes a first triangular shaped portion 211 at a first end thereof with a tip pointing towards a second direction opposite to the first direction, a rectangular shaped portion 212 at a middle thereof, and a second triangular shaped portion 213 at a second end thereof with a tip pointing towards the first direction. The first triangular shaped portion 211 is partially overlapped with the triangular shaped portion 201 of the first shaped linear structure. All these silicon-based structures are embedded in the cladding layer made by the insulator.

Figure 2C:
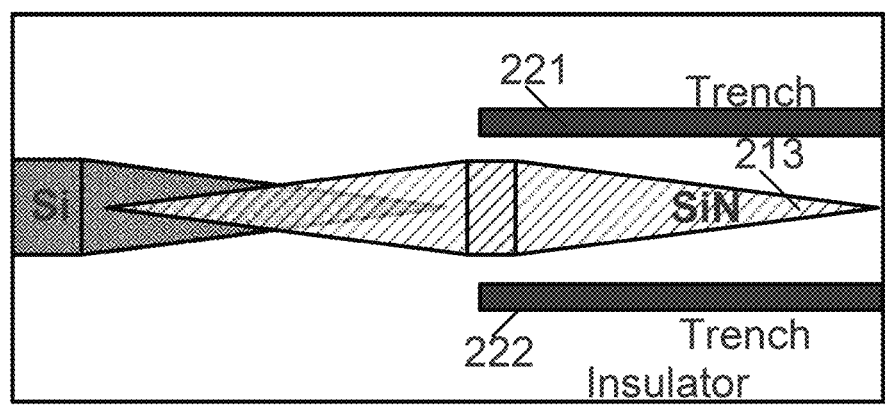
FIG. 2C is a top view of a mode size converter formed in the silicon-based wafer according to another embodiment of the present invention.

FIG. 2C is a top view of a mode size converter formed in the silicon-based wafer according to another embodiment of the present invention. This diagram is merely an example, which should not unduly limit the scope of the claims. One of ordinary skill in the art would recognize many variations, alternatives, and modifications. As shown, the MSC described in FIG. 2B is further configured with two deep trenches 221 and 222 separately disposed at two sides of the second shaped linear structure including the second triangular shape portion 213 and partially the rectangular shaped portion 212. All these silicon-based structures are embedded in the cladding layer made by the insulator. Optionally, the two deep trenches 221 and 222 are hollow. Optionally, the two deep trenches 221 and 222 are filled by a different material from the cladding layer. The MSC is configured, by optimizing the dimensions of the first shaped linear structure and the second shaped linear structure (or optionally with two deep trenches), to achieve proper matching of the modes of optical wave travelled from a fiber to a waveguide formed in the silicon-based wafer. In other words, the MSC typically is formed at an edge region of the SPIC 1000 associated with either an optical input port or an optical output port.

Figure 3A:
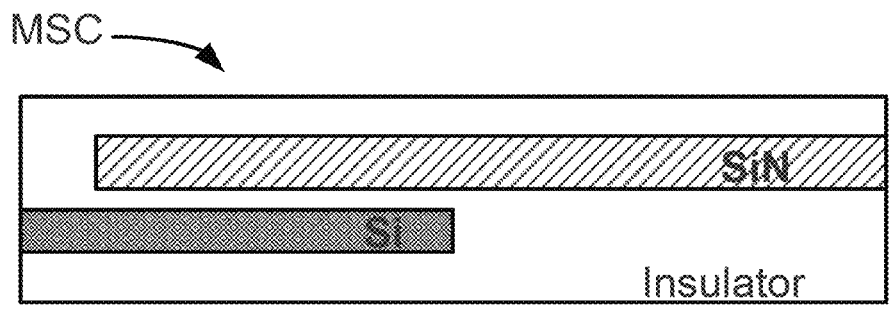
FIG. 3A is a side view of a mode size converter formed in the silicon-based wafer according to another embodiment of the present invention.
Figure 3B:
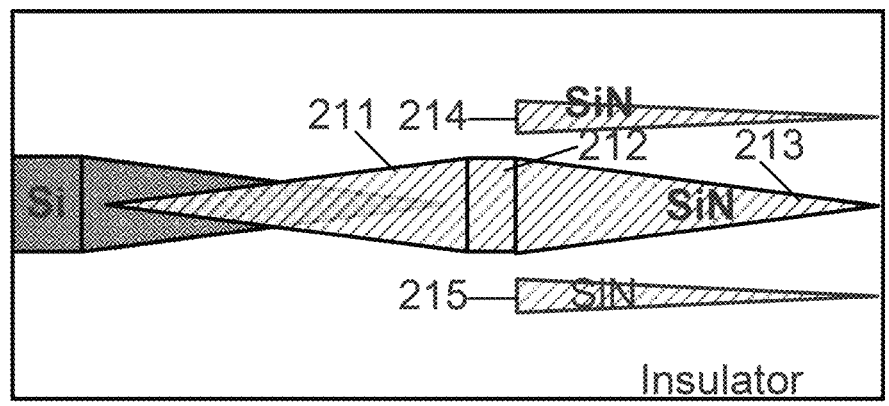
FIG. 3B is a top view of the mode size converter formed in the silicon-based wafer according to the embodiment of the present invention.
Figure 3C:
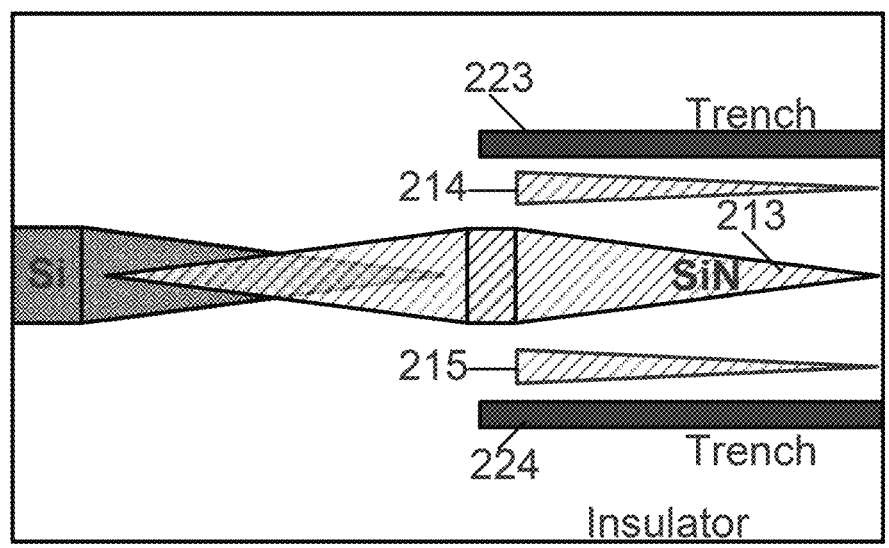
FIG. 3C is a top view of a mode size converter formed in the silicon-based wafer according to yet another embodiment of the present invention.

FIG. 3A is a side view of a mode size converter formed in the silicon-based wafer according to another embodiment of the present invention. As shown, the MSC is substantially like that described in FIG. 2A in this side view diagram. FIG. 3B is a top view of the mode size converter formed in the silicon-based wafer according to the embodiment of the present invention. Here in the top vide diagram, it is revealed that the MSC of this embodiment also includes two isolated triangular shaped structures 214 and 215 made by the silicon nitride layer with their tips pointing towards the first direction and separately disposed at two sides of the second triangular shaped portion 213 of the second shaped linear structure. Further, FIG. 3C shows a top view of a mode size converter formed in the silicon-based wafer according to yet another embodiment of the present invention. As shown, the MSC described in FIG. 3B is further configured with two deep trenches 223 and 224 separately disposed at respective two outer sides of the two isolated triangular shape structures 214 and 215. All these silicon-based structures are embedded in the cladding layer made by the insulator. Optionally, the two deep trenches 223 and 224 are hollow. Optionally, the two deep trenches 223 and 224 are filled by a different material from the cladding layer. The MSC is configured, by optimizing the dimensions of the first shaped linear structure and the second shaped linear structure (or optionally with two deep trenches), to achieve proper matching of the modes of optical wave travelled from a fiber to a waveguide formed in the silicon-based wafer. In other words, the MSC typically is formed at an edge region of the SPIC 1000 associated with either an optical input port or an optical output port.

Figure 4A:
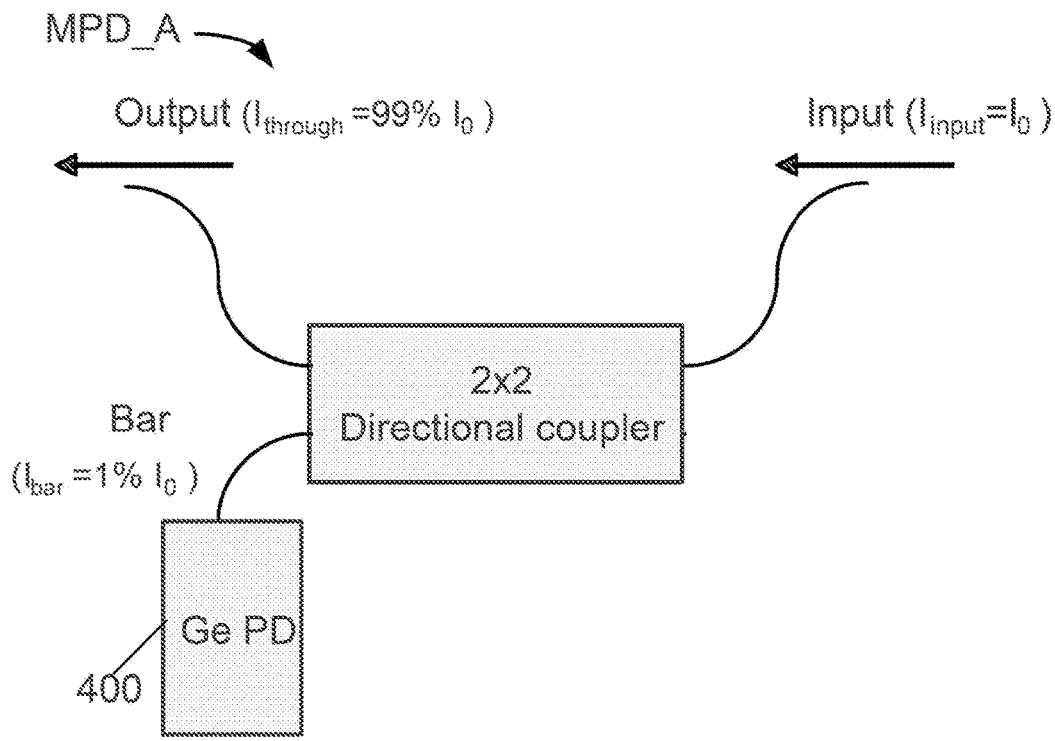
FIG. 4A is a schematic diagram of a monitoring photo detector with uni-directional operation according to an embodiment of the present invention.

FIG. 4A is a schematic diagram of a monitoring photo detector with uni-directional operation according to an embodiment of the present invention. This diagram is merely an example, which should not unduly limit the scope of the claims. One of ordinary skill in the art would recognize many variations, alternatives, and modifications. As shown, the monitoring photo detector (MPD_A) is configured to operate in uni-directional fashion. Referring to FIG. 1, the MPD_A is employed in the input waveguide 11 (or 12) for monitoring the laser light signal received by the TX input port via a MSC thereof. Referring to FIG. 4A, MPD_A includes a 2×2 directional coupler having a first input port (Input) coupled to the TX-input port (see FIG. 1) receiving a laser light with an input optical power, $I_{input}=I_0$. The MPD_A has a second input port being terminated. The MPD-A further has a first output port (Output) coupled to one of the 1×2 directional coupler coupled to the input waveguide 11 (or 12), as seen in FIG. 1. Optionally, the 1×2 directional coupler is provided as a 50/50 splitter formed in the silicon-based wafer from the silicon nitride layer thereof. The 2×2 directional coupler is provided as a dual-direction 99/1 splitter formed in the silicon-based wafer from the silicon nitride layer thereof. The first output port (Output) is configured to be a main output port that passes through 99% of the input optical power, $I_{through}=99\% I_0$. Furthermore, the MPD-A has a second output port (Bar) coupled to a Germanium photo detector 400, which is a Germanium-based high-speed photo diode. The second output port (Bar) is configured to a tap output to deliver about 1% optical power of the incoming light signal to the Germanium-based high-speed photo diode for monitoring the corresponding laser light signal. The detailed structures of the Germanium-based high-speed photo diode will be presented in the specification below.

Figure 4B:
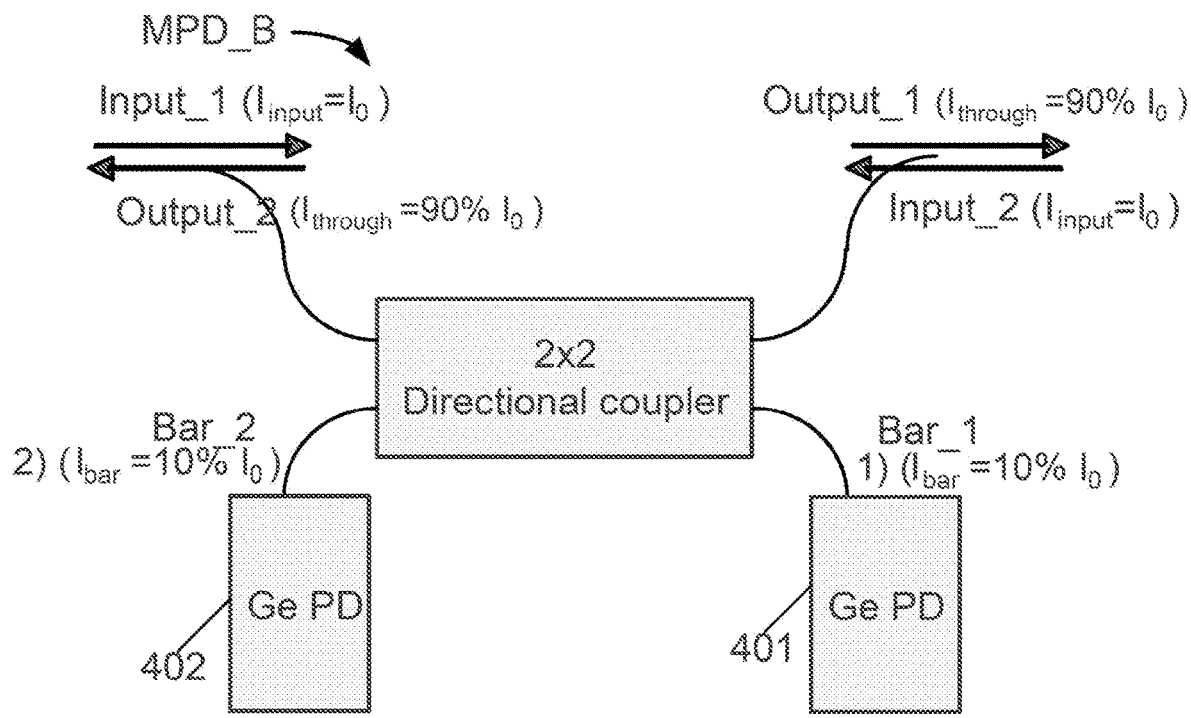
FIG. 4B is a schematic diagram of a monitoring photo detector with bi-directional operation according to an embodiment of the present invention.

FIG. 4B is a schematic diagram of a monitoring photo detector with bi-directional operation according to an embodiment of the present invention. This diagram is merely an example, which should not unduly limit the scope of the claims. One of ordinary skill in the art would recognize many variations, alternatives, and modifications. As shown, the monitoring photo detector (MPD_B) is configured to operate in bi-directional fashion. Referring to FIG. 1, the MPD_B is employed between one of mod-output waveguide (e.g., 1112) and one of corresponding output waveguide (e.g., 21) that is coupled to a MSC associated with one TX-output port. Referring to FIG. 4B and FIG. 1, the MRD_B can be used to monitor an input light signal in direction 1) (e.g., from the MOD) or in opposite direction 2) (e.g., from the TX-output port). In the embodiment shown in FIG. 4B, the MPD_B is configured, in a first one of the bi-directional operations, as a 2×2 directional coupler is configured with a first input port (Input_1) coupled to the mod-output waveguide (e.g. 1112) of a MOD (see FIG. 1) and a first through-output port (Output_1) coupled to one output waveguide (e.g., 21) (see FIG. 1) and a first bar-output port (Bar_1) coupled to a first Germanium photo detector 401. Optionally, the 2×2 directional coupler is provided as a dual-direction 90/10 splitter formed in the silicon-based wafer from the silicon nitride layer thereof. In the first one operation, the first through-output port (Output_1) is configured to a main output to pass through about 90% optical power of one output light signal from the MOD and the first bar-output port (Bar_1) is configured to tap about 10% optical power of the output light signal detected by the first Germanium photo detector 401. Furthermore, the 2×2 directional coupler also includes, as the MPD_B is configured in a second one of the bi-directional operations, a second bar-output port (Bar_2) coupled to a second Germanium photo detector 402. In the second one operation, the first through-output port (Output_1) is alternatively configured to a second input port (Input_2) receiving a returned signal from the one output waveguide and the first input port (Iuput_1) is alternatively configured to be a second through-output port (Output_2). The second Germanium photo detector 402 is configured to detect about 10% of the optical power of the returned signal from the one output waveguide. Both the first second Germanium photo detector 401 and the second Germanium photo detector 402 are provided as Germanium-based high-speed photo diodes. The detailed structures of the Germanium-based high-speed photo diode will be presented in the specification below.

Figure 5:
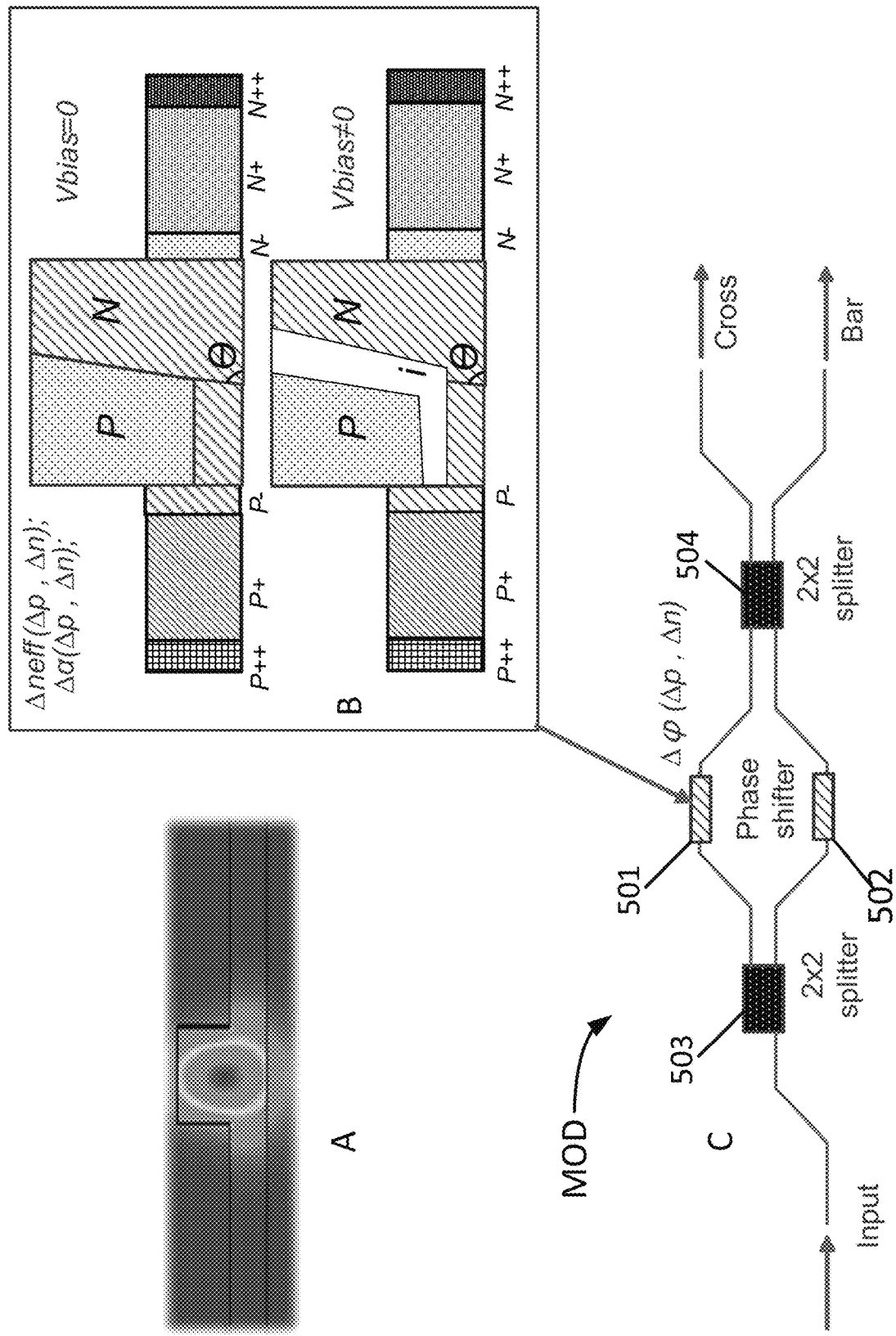
FIG. 5 is a schematic diagram of a silicon optical modulator based on Mach-Zehnder interferometer according to an embodiment of the present invention.

FIG. 5 is a schematic diagram of a silicon optical modulator based on Mach-Zehnder interferometer according to an embodiment of the present invention. This diagram is merely an example, which should not unduly limit the scope of the claims. One of ordinary skill in the art would recognize many variations, alternatives, and modifications. In the embodiment, the silicon optical modulator (MOD) is designed to work under free-carrier dispersion effect. Under free-carrier dispersion effect, the refractive index and absorption coefficient of doped silicon can be changed along with the concentration of free electron and holes which can be tuned by the externally applied electrical field. Usually the changing of free-carriers concentration is realized by implanting a P-N junction in the center of a silicon waveguide so that when there is optical wave traveling through, the optical parameters such as optical phase and optical intensity can be tuned by the externally applied electrical field (or bias voltage). As the changing of absorption coefficient within silicon material is not that efficient, the refractive index change is being utilized in which it may need to optimize the silicon waveguide optical structures to convert the optical phase change to optical intensity change. The most-friendly optical structure to realize this purpose is Mach-Zehnder interferometer or micro-ring resonator. Meanwhile the electrical structure for tuning the electrical field is a reversed PN junction. As shown in FIG. 5, the Mach-Zehnder interferometer structure with two linear silicon waveguide branches is utilized as a phase shifter of the silicon optical modulator in this embodiment.

Part A) of FIG. 5 shows an optical intensity profile in a cross-section plane of a ridge-shaped waveguide is shown, indicating most energy is concentrated near a central portion of the ridge-shaped silicon waveguide. Part B) of the figure shows a cross-sectional view of the ridge-shaped silicon waveguide and a PN junction formed at the central portion of the ridge-shaped silicon waveguide. Unlike typical PN junction that is formed with a straight border line along the middle height line of the central portion, the embodiment of the present invention provides a PN junction with an irregular shaped border line with prolonged border-length across the central portion. As shown in the example, the border line is a L-shape separating a p-region and a n-region before a bias voltage (Vbias=0). The p-region is in contact with a first side portion and the n-region is in contact with a second side portion, both having a smaller height than the central portion throughout a length of the ridge-shaped silicon waveguide. The first side portion contains a P++ doping section configured to form a first electrode via a metallic contact and the second side portion contains a N++ section configured to form a second electrode via a metallic contact. After applying the bias voltage (Vbias≠0) between the first electrode and the second electrode, a depletion region (i) with substantially the same L shape is formed along the border line by changing the electrical field therebetween so as to alter the free-carrier concentration across the PN junction. When there is optical wave traveling through the silicon waveguide, particularly with its main intensity being concentrated in the central portion where the PN junction exists, the optical parameters such as optical phase can be tuned by tuning the bias voltage applied to two external electrical field.

Part C) of the figure shows a full optical configuration of the silicon optical modulator (MOD) with the Mach-Zehnder interferometer structure as the phase shifter containing two ridge-shaped silicon waveguides 501 and 502 between a first 2×2 splitter 503 and a second 2×2 splitter 504 respectively disposed at input end and output end thereof. Optionally, the first 2×2 splitter 503 is coupled to a common input end of the two branches of ridge-shaped silicon waveguides and has an input port coupled to one mod-input waveguide (e.g., 111) (see FIG. 1). The second 2×2 splitter 504 is coupled to a common output end of the two branches of the ridge-shaped silicon waveguides to have a cross-output port coupled to one mod-output waveguide (e.g, 1112) and a bar-output port coupled to another mod-output waveguide (e.g., 1111) (see FIG. 1). The input optical signal is guided into the two branches 501 and 502 by the first 2×2 splitter 503 and respectively tuned in optical phases by the applied bias voltages across the two PN junctions associated thereof and two light signals from the two branches are recombined via interference effect at the common output end through the second 2×2 splitter 504 outputting an modulated output light signal at either a bar-output port or a cross-output port with optical intensity modulation converted from the phase changes. Optionally, a major portion of optical power of the modulated output light signal is delivered through the cross-output port.

Typically, the two branches of ridge-shaped silicon waveguides can be identical and made of Si or SiGe. The central portion optionally has a cross-section plane in a rectangular shape with a height and a width. The height is set to be greater than that of each of the first side portion and the second side portion. Optionally, the width is much greater than the height but is equal to or less than a width of each of the first side portion and the second side portion. Optionally, the border line of the PN junction can be made substantially longer than a nominal height of the central portion so that the capacity of the PN junction can be maximized to achieve highest modulation efficiency so that the length of the ridge-shaped silicon waveguide can be shortened to reduce optical loss and enhance bandwidth and modulation performance.

Figure 6:
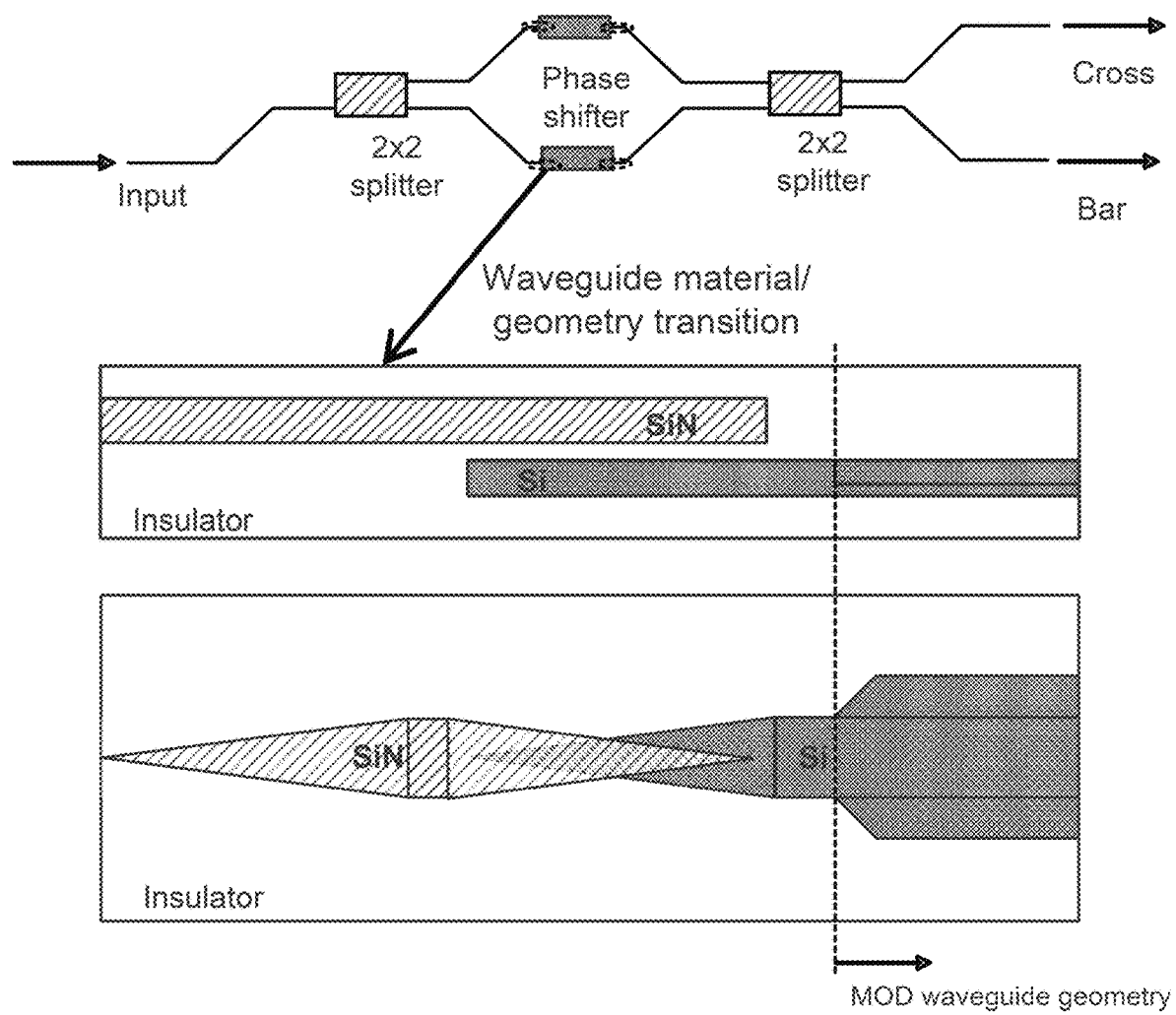
FIG. 6 is a schematic diagram illustrating a material transition structure at input/output ends of the silicon optical modulator of FIG. 5 according to an embodiment of the present invention.

In a specific embodiment, the waveguides formed in the RX sub-circuit and the TX sub-circuit including the waveguides directly linked to the input ports or output ports of the 2×2 splitters 503 and 504 are preferred to be made by the silicon nitride layer to reduce total insertion loss of the SPIC 1000. While the photonics devices involving active material like the MOD or Germanium photo detector, the waveguide therein is preferred to be made by silicon only (except with Germanium being added for the Germanium-based high-speed photo diode). FIG. 6 is a schematic diagram illustrating a material transition structure at input/output ends of the silicon optical modulator of FIG. 5 according to an embodiment of the present invention. Referring to FIG. 6, each of the two branches of silicon waveguides in the phase shifter of the MOD has a material transition structure from the silicon waveguide to a silicon nitride waveguide. As shown, the material transition structure includes a shaped silicon nitride layer with a rectangular portion coupled between a first triangular portion and a second triangular portion all embedded in the cladding insulator layer at a distance above a shaped silicon layer with one triangular portion that is naturally extended from the ridge-shaped silicon waveguide of one branch in the phase shifter of the MOD. The second triangular portion of the silicon nitride layer is partially overlapped with the one triangular portion of the shaped silicon layer and has corresponding triangular tips pointed to opposite directions towards each other.

Figure 7A:
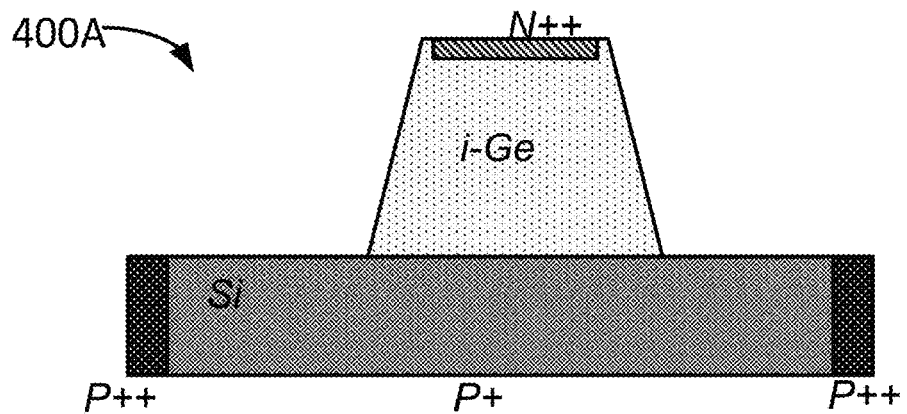
FIG. 7A is a simplified cross-sectional view of a Germanium-based high-speed photo diode according to an embodiment of the present invention.

The Germanium photo detectors mentioned in the SPIC 1000 (FIG. 1), including photo detector (RXHD) in the RX sub-circuit, the DPD in the TX sub-circuit, and the Germanium photo detector in MPD_A and MPD_B associated with the modulator (MOD), are provided as Germanium-based high-speed photo diode 400. These photo detectors are made on Germanium material with PN junction working under reversed bias voltage. Once the light (via silicon-based waveguide formed in the silicon-based wafer) is absorbed by the Germanium material it will be converted to free carriers and travels to corresponding electrodes under the reversed bias which form optical current. In SPIC 1000, the RX sub-circuit includes 4 channels Ge photo detectors having high speed performance. The TX sub-circuit includes 4 channels modulators (MOD), each has a Ge photo detector that may have high speed performance. FIG. 7A shows one embodiment in a simplified cross-sectional view of a Germanium-based high-speed photo diode. This diagram is merely an example, which should not unduly limit the scope of the claims. One of ordinary skill in the art would recognize many variations, alternatives, and modifications. In the embodiment, the Germanium-based high-speed photo diode 400A is provided with a hut shaped Germanium structure overlaying a box shaped Silicon structure formed in the silicon-based wafer. As shown, the hut shaped Germanium structure includes a major portion in intrinsic state (i-Ge) except a top portion in N++ doping state. The box shaped Silicon structure (Si) includes a central portion in P+ doping state except two end portions in P++ doping state. The major portion (i-Ge) of the hut shaped Germanium structure is in contact only with the central portion of the box shaped Silicon structure.

Figure 7B:
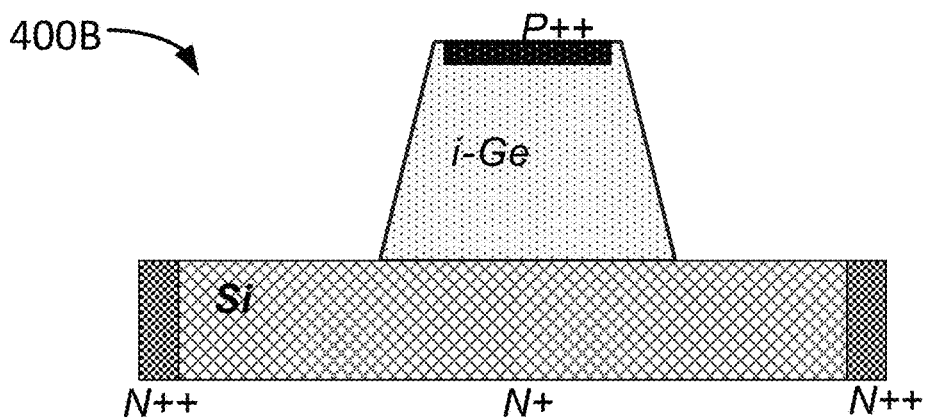
FIG. 7B is a simplified cross-sectional view of a Germanium-based high-speed photo diode according to another embodiment of the present invention.

FIG. 7B shows another embodiment in a simplified cross-sectional view of a Germanium-based high-speed photo diode. This diagram is merely an example, which should not unduly limit the scope of the claims. One of ordinary skill in the art would recognize many variations, alternatives, and modifications. In the embodiment, the Germanium-based high-speed photo diode 400B is provided with a hut shaped Germanium structure overlaying a box shaped Silicon structure formed in the silicon-based wafer. As shown, the hut shaped Germanium structure includes a major portion in intrinsic state (i-Ge) except a top portion in P++ doping state. The box shaped Silicon structure (Si) includes a central portion in N+ doping state (N+ Si) except two end portions in N++ doping state. The major portion (i-Ge) of the hut shaped Germanium structure is in contact only with the central portion (N+ Si) of the box shaped Silicon structure.

Figure 7C:
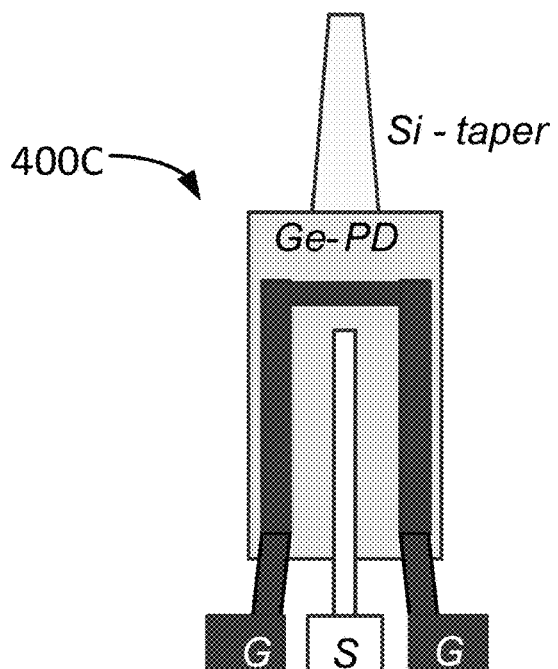
FIG. 7C is a simplified top view of the Germanium-based high-speed photo diode of either FIG. 7A or FIG. 7B with ground/source electrodes setting according to the embodiment of the present invention.

FIG. 7C is a simplified top view of the Germanium-based high-speed photo diode of either FIG. 7A or FIG. 7B with ground/source electrodes setting according to the embodiment of the present invention. This diagram is merely an example, which should not unduly limit the scope of the claims. One of ordinary skill in the art would recognize many variations, alternatives, and modifications. In some embodiments as shown here in FIG. 7C, the Germanium-based high-speed photo diode of either FIG. 7A or FIG. 7B further includes a source electrode (S) having a metallic contact with the top portion of the hut shaped Germanium structure and two ground electrodes (G) having metallic contacts with the two end portions of the box shaped Silicon structure and the two ground electrodes (G) are electrically connected together. Additionally, as shown in FIG. 7C, the Germanium-based high-speed photo diode 400C further comprises a taper shaped portion made of the silicon layer extended from one side of the central portion of the box shaped Silicon structure (Si) for coupling with a waveguide to detect the light signal traveling therein and convert it to an electrical signal across the source electrode (S) and the ground electrode (G).

Figure 7D:
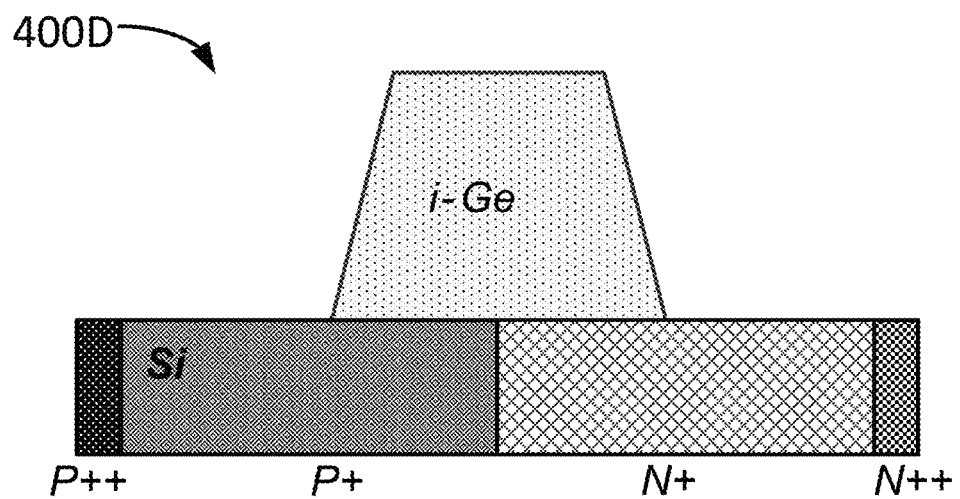
FIG. 7D is a simplified cross-sectional view of a Germanium-based high-speed photo diode according to yet another embodiment of the present invention.
Figure 7E:
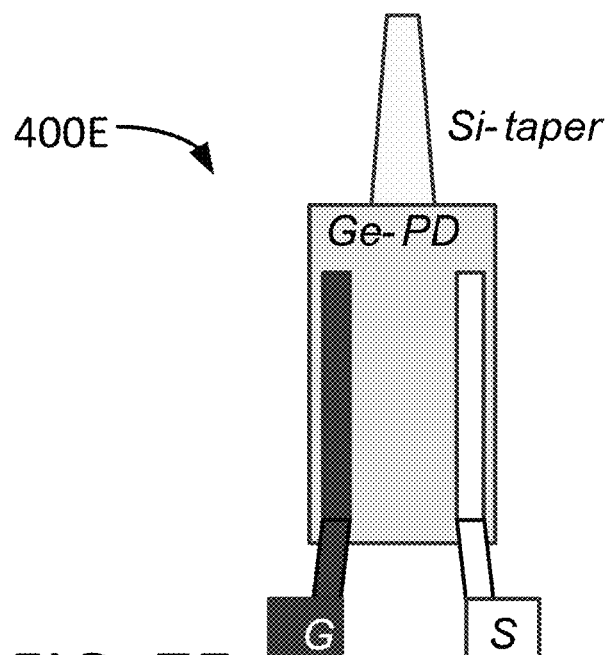
FIG. 7E is a simplified top view of the Germanium-based high-speed photo diode of FIG. 7D with ground/source electrodes setting according to the embodiment of the present invention.

FIG. 7D shows yet another embodiment in a simplified cross-sectional view of a Germanium-based high-speed photo diode. This diagram is merely an example, which should not unduly limit the scope of the claims. One of ordinary skill in the art would recognize many variations, alternatives, and modifications. As shown, the Germanium-based high-speed photo diode 400D includes a hut shaped Germanium structure overlaying a box shaped Silicon structure formed in a silicon-based wafer substrate. The hut shaped Germanium structure is wholly in intrinsic state (i-Ge) and the box shaped Silicon structure (Si) includes a first major portion in P+ doping state (P+ Si) junctioned with a second major portion in N+ doping state (N+ Si), a first end portion in P++ doping state (P++ Si) joined with the first major portion (P+ Si), and a second end portion in N++ doping state (N++ Si) jointed with the second major portion (N+ Si). The hut shaped Germanium structure (i-Ge) is in contact only with both the first major portion (P+ Si) and the second major portion (N+ Si) of the box shaped Silicon structure. Further, FIG. 7E shows a simplified top view of the Germanium-based high-speed photo diode of FIG. 7D with ground/source electrodes setting according to the embodiment of the present invention. The Germanium-based high-speed photo diode 400E is provided with a ground electrode (G) having a metallic contact with the first end portion (P++ Si) of the box shaped Silicon structure and a source electrode (S) having a metallic contact with the second end portion (N++ Si) of the box shaped Silicon structure. Additionally, as shown in FIG. 7E, the Germanium-based high-speed photo diode 400E further comprises a taper shaped portion made of the silicon layer extended from one side of the central portion of the box shaped Silicon structure (Si) for coupling with a waveguide to detect the light signal traveling therein and convert it to an electrical signal across the source electrode (5) and the ground electrode (G).

Figure 8:
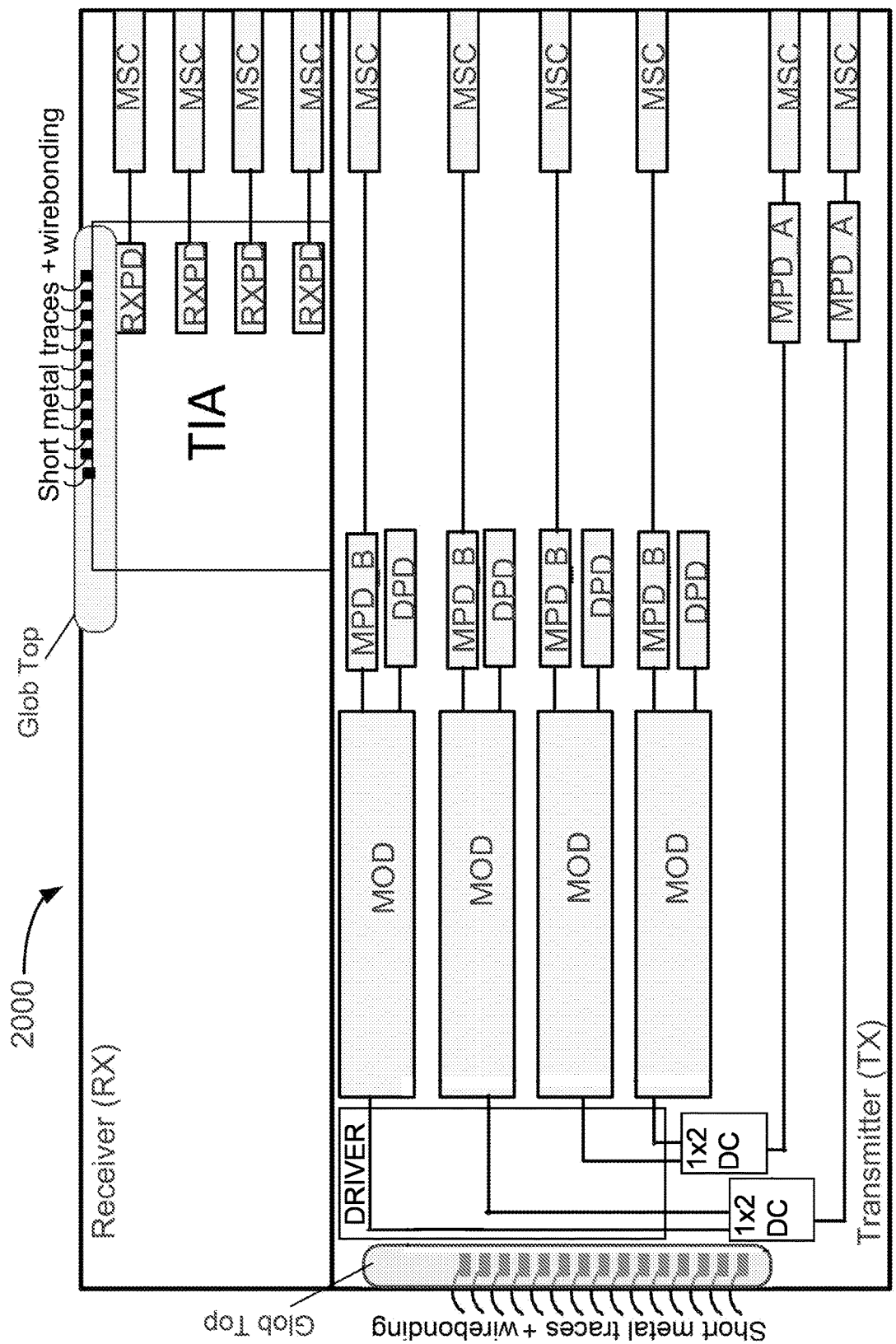
FIG. 8 is a simplified block diagram of the silicon photonics integrated circuit including short metal traces for forming solder-bonding connections with flip-chips of TIA or Driver modules and wirebonding connections to a printed circuit board according to an embodiment of the present invention.

FIG. 8 is a simplified block diagram of the silicon photonics integrated circuit including short metal traces for forming solder-bonding connections with flip-chips of TIA or Driver modules and wirebonding connections to a printed circuit board according to an embodiment of the present invention. This diagram is merely an example, which should not unduly limit the scope of the claims. One of ordinary skill in the art would recognize many variations, alternatives, and modifications. Referring to FIG. 8, a silicon photonics integrated circuit (SPIC) 2000 is provided. As shown, the SPIC 2000 is substantially similar to the SPIC 1000 of FIG. 1, including a RX sub-circuit (RX) and a TX sub-circuit (TX) formed in a single substrate member made by a silicon-based wafer. The RX sub-circuit of the SPIC 2000 further includes a plurality of short metal traces formed on a first edge region of a silicon substrate member used to form the SPEC 1000. The first edge region in an embodiment is located near and connected to the RX photo detector (RXPD). Some of the plurality of short metal traces are configured to form solder-bonding connections with a chip of a transimpedance amplifier (TIA) module in a flip-chip assembly. Rest of the plurality of short metal traces are configured to form wirebonding connections to a printed circuit board (PCB). Optionally, the wirebonding connections are encapsulated by an insulating glob top near the first edge region of the SPIC 2000.

Referring to FIG. 8, the TX sub-circuit of the SPEC 2000 also includes a plurality of short metal traces formed on a second edge region of the single substrate member used to form the SPIC 2000 near the 1×2 directional coupler (1×2 DC) and connected to the silicon optical modulators (MOD). Some of the plurality of short metal traces are configured to form solder-bonding connections with a chip of a driver module in a flip-chip assembly. Rest of the plurality of short metal traces are configured to form wirebonding connections to the printed circuit board (PCB). Optionally, the wirebonding connections are encapsulated by an insulating glob top near the second edge region of the SPIC 2000.

Optionally, one or more laser chips, PLC blocks, and ASIC chips are mounted to the PCB thereon and two laser outputs of the one or more laser chips may be used to provide light signals led to the TX-input ports of the TX sub-circuit of SPIC 2000. Optionally, the RX sub-circuit, after forming a flip-chip assembly with a TIA module, is able to receive 4 channels of incoming optical signals from a network and convert them to electrical signals for digital data processing by the TIA module. Optionally, the 4 channels of incoming optical signals are delivered from optical fibers via respective 4 mode size converters (MSC) at the 4 RX-input ports. Germanium-based high-speed photodetectors are used to detect these four optical signals separately and converted to respective electrical signals. The TIA module is used for independently processing four electrical signals converted from respective four optical signals for communicating with host electrical network system with expanded bandwidth. Thus, the SPIC 2000 becomes part of a silicon photonics transceiver with 4 optical channels. Optionally, each laser chip can be also formed on a silicon substrate and made by a DFB laser. Optionally, the driver module in the flip-chip assembly is provided independently. The driver module is configured to drive all of the four modulators to modulate the four channels of light signals respectively passing therethrough. Optionally, the driver module employs PAM-N (N is an integer) modulation protocol or NRZ modulation protocol to modulate the light signal based on corresponding data signals received by the driver module. For example, the modulators (MOD) are configured to provide PAM4 modulation though other formats can be employed. After modulation, the four channels of light signals are guided to respective four output waveguides with each output light signals being outputted through a mode size converter (MSC) to a fiber at a TX-output port. Optionally, the output light signal is used for data communication from a data center to a network.

Figure 9:
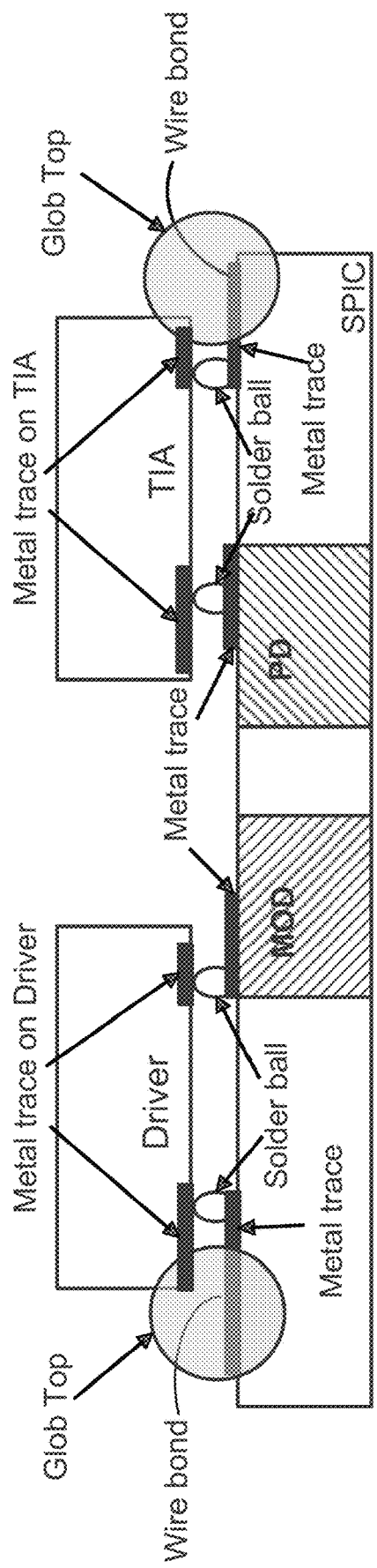
FIG. 9 is a schematic diagram of flip-chip assembly of electrical chips with the silicon photonics integration circuit chip on a Silicon-based wafer according to an embodiment of the present invention.

In another aspect, the present disclosure provides a compact silicon photonics integrated circuit in a silicon-based wafer ready for forming flip-chip assemblies with TIA module chip and driver chip and for forming wirebonding with a printed circuit board. FIG. 9 is a schematic diagram of flip-chip assembly of electrical chips with the silicon photonics integration circuit chip on a Silicon-based wafer according to an embodiment of the present invention. This diagram is merely an example, which should not unduly limit the scope of the claims. One of ordinary skill in the art would recognize many variations, alternatives, and modifications. As shown, the bottom portion is a simplified version of a silicon photonics integrated circuit (SPIC) chip, such as the SPIC 1000 shown in FIG. 1. The SPIC chip includes at least a modulator (MOD) and a photodetector (PD) all formed within a single silicon-based wafer. Optionally, the MOD is one of multiple silicon optical modulators in a TX sub-circuit and the PD is one or multiple high-speed photo diodes in a RX sub-circuit. On a surface of the silicon photonics integrated circuit chip, metal traces are formed at least partially to contact with the at least one MOD and one PD. On part of the metal traces that are at least partially in contact with the MOD or PD, one or more solder halls are formed. A TIA chip, which is fabricated separately, includes one or more metal traces on its surface which is flipped to form electrical connection via soldering with the solder balls on the metal traces that are partially in contact with the PD. A Driver chip, which is fabricated separately, includes one or more metal traces on its surface which is flipped to for n electrical connection via soldering with the solder balls on the metal traces that are partially in contact with the MOD. Additionally, metal wires are bonded to some metal trances located at edges of the SPIC chip. Insulation glob top is provided to encapsulate the respective wirebonding connections thereof. Optionally, the wirebonding connections are utilized for forming electrical connection with a printed circuit board (PCB) to integrate the SPIC chip, the TIA chip, the Driver chip, and one or more laser chips, and optionally other ASIC chips and PLC blocks to form a silicon photonics transceiver. The silicon photonics transceiver based on the SPIC provided by the present disclosure is optionally used in 100 Gbps and 400 Gbps DR4 application following IEEE 802.3bs 100 GBASE-DR4 and 400 GBASE-DR4 with the advantage of high speed, low power consumption and low cost, although other applications are possible.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A silicon photonics integration circuit for connecting silicon photonics circuits to an optical fiber, the silicon photonics integration circuit comprising:
   a substrate;
   a mode size converter disposed in the substrate, the mode size converter coupled to the optical fiber and configured to match a mode size of the optical fiber to the silicon photonics integration circuit, the mode size converter comprising:
      a photonic insulator;
      a first waveguide made of a first semiconductor material embedded in the photonic insulator; and a second waveguide made of a second semiconductor material, different from the first semiconductor material, spaced apart from and arranged above the first waveguide and embedded in the photonic insulator, the first and second waveguides being respectively configured to partially overlap each other;

wherein the photonic insulator further comprises first and second trenches disposed laterally on opposite sides of the second waveguide; and wherein the first and second trenches are hollow and are filled with air.

2. The silicon photonics integration circuit of claim 1 wherein the photonic insulator is a cladding layer.

3. The silicon photonics integration circuit of claim 1 wherein the first semiconductor material includes silicon and wherein the second semiconductor material includes silicon nitride.

4. The silicon photonics integration circuit of claim 1 wherein the first and second waveguides have different shapes.

5. The silicon photonics integration circuit of claim 1 wherein the second waveguide is longer than the first waveguide.

6. The silicon photonics integration circuit of claim 1 wherein the partially overlapping portions of the first and second waveguides taper in opposite directions.

7. The silicon photonics integration circuit of claim 1 wherein:

only one portion of the first waveguide that partially overlaps a portion of the second waveguide tapers; and the partially overlapping and non-overlapping portions of the second waveguide respectively taper in opposite directions.

8. The silicon photonics integration circuit of claim 1 wherein:

a first portion of the first waveguide tapers in a first direction;

a first portion of the second waveguide that partially overlaps with the first portion of the first waveguide tapers in a second direction that is opposite to the first direction; and a second portion of the second waveguide that does not overlap with the first portion of the first waveguide tapers in the first direction.

9. The silicon photonics integration circuit of claim 1 wherein the first and second trenches extend along a portion of the second waveguide that does not overlap with the first waveguide.

10. The silicon photonics integration circuit of claim 1 wherein the first and second trenches are parallel to each other.

11. The silicon photonics integration circuit of claim 1 wherein the first and second trenches have the same shape.

12. The silicon photonics integration circuit of claim 1 wherein the second waveguide further comprises first and second layers of the second semiconductor material disposed in the photonic insulator respectively between the first and second trenches and the opposite sides of the second waveguide.

13. The silicon photonics integration circuit of claim 12 wherein the first and second layers extend along a portion of the second waveguide that does not overlap with the first waveguide.

14. The silicon photonics integration circuit of claim 12 wherein the first and second layers and a portion of the second waveguide that does not overlap with the first waveguide taper in the same direction away from the first waveguide.

15. A silicon photonics integration circuit for connecting silicon photonics circuits to an optical fiber, the silicon photonics integration circuit comprising:

a substrate;

a mode size converter disposed in the substrate, the mode size converter coupled to the optical fiber and configured to match a mode size of the optical fiber to the silicon photonics integration circuit, the mode size converter comprising:

a photonic insulator;

a first waveguide made of a first semiconductor material embedded in the photonic insulator; and a second waveguide made of a second semiconductor material, different from the first semiconductor material, spaced apart from and arranged above the first waveguide and embedded in the photonic insulator, the first and second waveguides being respectively configured to partially overlap each other;

wherein the photonic insulator further comprises first and second trenches disposed laterally on opposite sides of the second waveguide;

wherein the second waveguide further comprises first and second layers of the second semiconductor material disposed in the photonic insulator respectively between the first and second trenches and the opposite sides of the second waveguide;

wherein a first portion of the first waveguide tapers in a first direction;

wherein a first portion of the second waveguide that partially overlaps with the first portion of the first waveguide tapers in a second direction that is opposite to the first direction;

wherein a second portion of the second waveguide that does not overlap with the first portion of the first waveguide tapers in the first direction; and wherein the first and second layers taper in the first direction.

16. A silicon photonics integration circuit for connecting silicon photonics circuits to an optical fiber, the silicon photonics integration circuit comprising:

a substrate;

a mode size converter disposed in the substrate, the mode size converter coupled to the optical fiber and configured to match a mode size of the optical fiber to the silicon photonics integration circuit, the mode size converter comprising:

a photonic insulator;

a first waveguide made of a first semiconductor material embedded in the photonic insulator; and a second waveguide made of a second semiconductor material, different from the first semiconductor material, spaced apart from and arranged above the first waveguide and embedded in the photonic insulator, the first and second waveguides being respectively configured to partially overlap each other; and an optical modulator comprising:

third and fourth waveguides disposed parallel to each other in the substrate;

first input and output ends comprising the second semiconductor material coupled to the third waveguide; and second input and output ends comprising the second semiconductor material coupled to the fourth waveguide; and separate sets of the first and second waveguides coupled to the first and second input and output ends.

17. The silicon photonics integration circuit of claim 16 wherein in each of the separate sets:
a portion of the first waveguide that does not overlap with the second waveguide is coupled to a respective end of a respective one of the third and fourth waveguides; and
the portion of the respective end is embedded in the photonic insulator.

18. The silicon photonics integration circuit of claim 16 wherein:
third and fourth waveguides respectively comprise first and second PN junctions; and
wherein at least one of the first and second PN junctions is disposed at an interface between a P type doped region and a N type doped region, the interface having an irregular shape that is not perpendicular to a plane in which the second substrate lies.

19. The silicon photonics integration circuit of claim 18 wherein the interface separating the P type doped region and the N type doped region is along a line that is slanted relative to an axis perpendicular to the plane in which the second substrate lies.

20. The silicon photonics integration circuit of claim 19 wherein the line is L-shaped.

21. The silicon photonics integration circuit of claim 16 further comprising:
a first splitter coupled to the first and second inputs of the third and fourth waveguides, the first splitter configured to receive an optical signal and to guide the optical signal into the first and second inputs of the third and fourth waveguides; and
a second splitter coupled to the first and second outputs of the third and fourth waveguides, the second splitter configured to combine modulated light signals from the first and second outputs of the third and fourth waveguides.

22. A silicon photonics integration circuit for connecting silicon photonics circuits to an optical fiber, the silicon photonics integration circuit comprising:
a substrate;
a mode size converter disposed in the substrate, the mode size converter coupled to the optical fiber and configured to match a mode size of the optical fiber to the silicon photonics integration circuit, the mode size converter comprising:
a photonic insulator;
a first waveguide made of a first semiconductor material embedded in the photonic insulator; and
a second waveguide made of a second semiconductor material, different from the first semiconductor material, spaced apart from and arranged above the first waveguide and embedded in the photonic insulator, the first and second waveguides being respectively configured to partially overlap each other; and
a photodiode comprising a silicon portion and a germanium portion;
wherein the first and second waveguides coupled to the germanium portion; and
wherein the silicon portion is rectangular, the germanium portion is trapezoidal having a first side disposed on the silicon portion and a second side opposite the first side being smaller than the first side, and the first and second waveguides are coupled to the second side of the germanium portion.

23. The silicon photonics integration circuit of claim 22 wherein the silicon portion is doped with a first type of dopant and the germanium portion is doped with a second type of dopant that is different than the first type of dopant.

24. The silicon photonics integration circuit of claim 22 wherein a first portion of the silicon portion is doped with a first type of dopant, a second portion of the silicon portion is doped with a second type of dopant that is different than the first type of dopant, and the germanium portion is not doped and overlaps the first and second portions.

* * * * *